United States Patent
Thiers

(10) Patent No.: US 6,766,622 B1
(45) Date of Patent: Jul. 27, 2004

(54) FLOOR PANEL FOR FLOOR COVERING AND METHOD FOR MAKING THE FLOOR PANEL

(75) Inventor: Bernard Paul Joseph Thiers, Oostrozebeke (BE)

(73) Assignee: Unilin Beheer B.V. (NL)

( * ) Notice: Subject to any disclaimer, the term of this patent is extended or adjusted under 35 U.S.C. 154(b) by 0 days.

(21) Appl. No.: 09/743,803

(22) PCT Filed: Jul. 20, 1999

(86) PCT No.: PCT/BE99/00091

§ 371 (c)(1),
(2), (4) Date: Jan. 22, 2001

(87) PCT Pub. No.: WO00/06854

PCT Pub. Date: Feb. 10, 2000

(30) Foreign Application Priority Data

Jul. 24, 1998 (BE) .............................................. 9800561
Apr. 14, 1999 (BE) .............................................. 9900256

(51) Int. Cl.[7] .............................. E04B 2/08; E04B 2/18
(52) U.S. Cl. .................... 52/591.3; 52/282.1; 52/582.1; 52/586.1; 52/591.1; 52/592.2; 403/364; 403/381; 144/364; 144/380
(58) Field of Search ............................... 52/578, 582.1, 52/586.1, 591.1, 591.3, 591.4, 592.2, 592.1, 282.1; 403/381, 364; 144/359–361, 363, 364, 380, 24.02

(56) References Cited

U.S. PATENT DOCUMENTS

| | | | | |
|---|---|---|---|---|
| 3,579,941 A | * | 5/1971 | Tibbals | .......................... 52/384 |
| 4,543,765 A | * | 10/1985 | Barrett | ..................... 52/747.11 |
| 5,497,589 A | | 3/1996 | Porter | |
| 5,502,939 A | * | 4/1996 | Zadok et al. | ............... 52/309.9 |
| 5,661,937 A | * | 9/1997 | Doppler et al. | ................ 52/410 |
| 6,006,486 A | | 12/1999 | Moriau et al. | |
| 6,029,416 A | * | 2/2000 | Andersson | .................. 52/592.1 |
| 6,101,778 A | * | 8/2000 | Martensson | ................. 52/582.1 |
| 6,182,410 B1 | * | 2/2001 | Pervan | ........................ 52/403.1 |
| 6,209,278 B1 | * | 4/2001 | Tychsen | ..................... 52/592.1 |
| 6,216,409 B1 | * | 4/2001 | Roy et al. | .................... 52/592.1 |
| 6,260,326 B1 | * | 7/2001 | Muller-Hartburg | ........... 52/601 |
| 6,314,701 B1 | * | 11/2001 | Meyerson | ................... 52/588.1 |
| 6,324,803 B1 | * | 12/2001 | Pervan | ........................ 52/403.1 |
| 6,324,809 B1 | * | 12/2001 | Nelson | ........................ 52/592.2 |
| 6,345,481 B1 | * | 2/2002 | Nelson | ........................ 52/592.2 |
| 6,418,683 B1 | * | 7/2002 | Martensson et al. | ........ 52/282.1 |
| 6,421,970 B1 | * | 7/2002 | Martensson et al. | ........ 52/282.1 |
| 6,446,405 B1 | * | 9/2002 | Pervan | ........................ 52/403.1 |
| 6,490,836 B1 | * | 12/2002 | Moriau et al. | .............. 52/589.1 |
| 6,532,709 B2 | * | 3/2003 | Pervan | ........................ 52/403.1 |
| 6,588,166 B2 | * | 7/2003 | Martensson et al. | ........... 52/578 |

(List continued on next page.)

FOREIGN PATENT DOCUMENTS

| | | | | |
|---|---|---|---|---|
| DE | 297 10 175 | | 9/1997 | |
| EP | 1262609 | * | 4/2002 | ........... E04F/15/04 |
| WO | WO 94/26999 | | 11/1994 | |
| WO | WO 96/27719 | | 9/1996 | |

*Primary Examiner*—Carl D. Friedman
*Assistant Examiner*—Yvonne M. Horton
(74) *Attorney, Agent, or Firm*—Bacon & Thomas, PLLC

(57) ABSTRACT

Floor covering, consisting of floor panels (1) based on a fiber-like material bound by a binding agent, more particularly MDF or HDF, which, at least at their edges, are connected to each other by means of a connection, more particularly a tongue-and-groove connection (2–3) which connection consists of coupling parts which are made in one piece with the floor panels and is shaped in such a manner that the floor panels (1) are locked glue-free in the direction parallel to the plane of the floor covering and transverse to the connection, as well as in a direction perpendicular to this plane, characterized in that, at least at the location where the floor panels (1) cooperate with each other, a sliding agent (12–12A) is provided at least on one of the floor panels (1).

31 Claims, 3 Drawing Sheets

U.S. PATENT DOCUMENTS

| | | | |
|---|---|---|---|
| 6,601,359 B2 * | 8/2003 | Olofsson | 52/588.1 |
| 6,606,834 B2 * | 8/2003 | Martensson et al. | 52/282.1 |
| 2002/0023702 A1 * | 2/2002 | Kettler | 156/62.2 |
| 2002/0189747 A1 * | 12/2002 | Steinwender | 156/157 |
| 2003/0024199 A1 * | 2/2003 | Pervan et al. | 52/589.1 |
| 2003/0024200 A1 * | 2/2003 | Moriau et al. | 52/592.1 |
| 2003/0024201 A1 * | 2/2003 | Moriau et al. | 52/592.1 |
| 2003/0029115 A1 * | 2/2003 | Moriau et al. | 52/592.1 |
| 2003/0029116 A1 * | 2/2003 | Moriau et al. | 52/592.1 |
| 2003/0029117 A1 * | 2/2003 | Moriau et al. | 52/592.1 |
| 2003/0079820 A1 * | 5/2003 | Palsson et al. | 156/91 |
| 2003/0115812 A1 * | 6/2003 | Pervan | 52/283 |
| 2004/0031225 A1 * | 2/2004 | Fowler | 52/578 |
| 2004/0035077 A1 * | 2/2004 | Martensson et al. | 52/578 |
| 2004/0035079 A1 * | 2/2004 | Evjen | 52/592.1 |

* cited by examiner

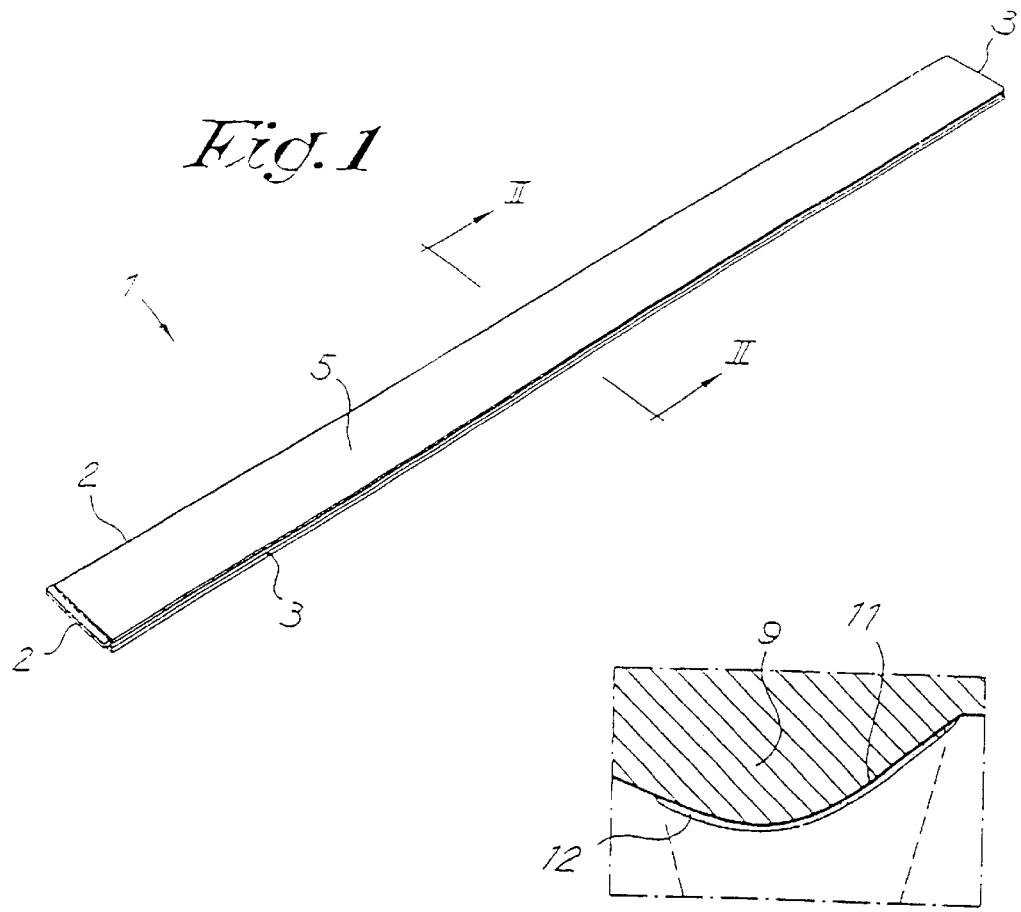
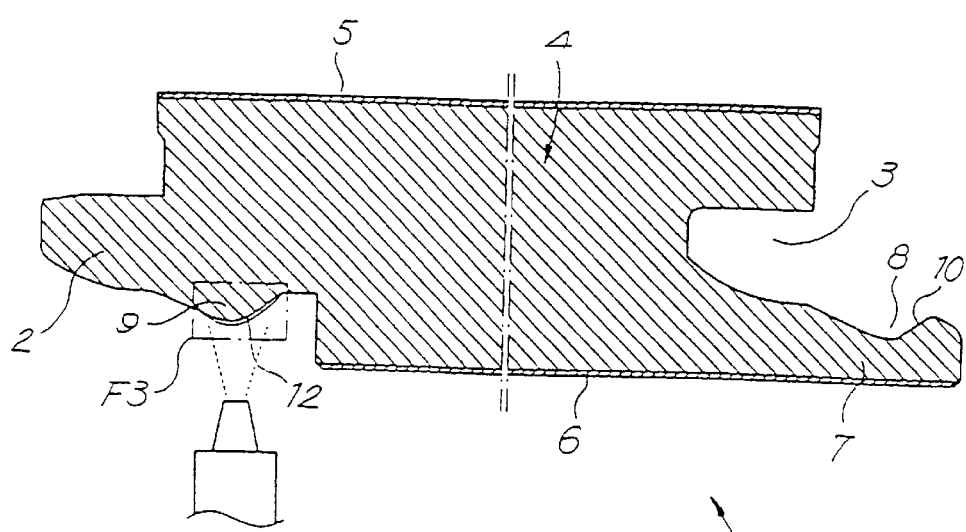

FLOOR PANEL FOR FLOOR COVERING AND METHOD FOR MAKING THE FLOOR PANEL

BACKGROUND OF THE INVENTION

1. Field of the Invention

This invention relates to a floor panel for use in making floor coverings, as well as a method for making the floor panel.

2. Related Art

More particularly, the invention relates to a floor panel which, at least at its edges, includes tongue-and-groove connection parts, which are made in one piece with the floor panel and shaped in such a manner that when coupled together along mutual edges by the tongue and groove coupling parts the floor panels are locked glue-free in a direction parallel to the plane of the panels and transverse to the edge connection, as well as in a direction perpendicular to this plane. Such floor covering panels are described in U.S. Pat. No. 6,006,486.

The floor panels can be joined together very fast by means of clicking and/or turning and are connected firmly without the necessity of using glue. It is also possible to disconnect these floor panels, after which they can be used again at another location.

When the floor covering is stepped on, it may occur that two adjacent panels undergo a minimal bending and, thus, carry out a movement in respect to each other. This movement is not unusual, as the floor panels are normally installed over an insulating and somewhat resilient underlay material.

This movement between the floor panels may result in a creaking noise, due to the friction which is created at the surfaces which are in contact with each other, because the coupling has locking surfaces associated with the tongue and groove parts between two panels which extend in a direction other than the horizontal direction (parallel to the principal plane of the panels).

It was noted that this phenomenon occurs with floor panels which are made of a material having a glued fibre-like wood based material, more particularly MDF or HDF.

In spite of the fact that by the use of tongue-and-groove connections made from MDF or HDF a rather smooth surface is obtained, as a result of which the aforementioned clicking and/or turning into each other takes place in a particularly easy manner, over the long term wear and tear may result from the mutual movement of the floor panels, as a result of which the trouble-free fitting of the floor panels can be influenced disadvantageously.

This invention in first instance has as an objective a floor covering panel in which the aforementioned and other disadvantages are avoided and, when being stepped upon, the creaking between the floor panels is avoided whereas over the long term the wear and tear of the tongue-and-groove connection also is limited.

According to the invention, this object is achieved in that a non-metallic sliding agent is applied on at least one of the panels at least at the location where the floor panels cooperate with each other, generally at the tongue-and-groove connection. The sliding agent is applied in the factory, for example, subsequent to the fabrication of the floor panels.

Due to the presence of this sliding agent, the floor panels, with the coupling parts of their tongue-and-groove connected, can slide over each other without thereby creating a perceptible sound. Due to the presence of the sliding agent, the friction, moreover, is reduced, as a result of which there is less wear and tear. If the sliding agent is provided at well-defined locations, this, as will be explained hereafter, also results in the floor panels being more easily joined, as the sliding agent reduces resistance during joining.

Preferably, a sliding agent is applied in the form of a layer which lies at least partially on top of the surface of one or both edges involved. By working with a layer on top of the surface, a good lubricating and sliding function is obtained.

According to a first possibility, the sliding agent is applied substantially over the entire surface of the edge of at least one of the floor panels.

According to a second embodiment, however, the sliding agent is applied in the form of one or more local strips extending in the longitudinal direction at the tongue-and-groove connection. Due to the provision of the sliding agent in the form of strips, it can easily be applied in a continuous process. Moreover, by applying such a strip locally, it is possible to avoid, due to the deformation of the sliding agent, that the latter is pushed beyond the tongue-and-groove connection, as a result of which a soiling at the upper side of the floor covering is avoided. Moreover, by local application in the form of a strip, the sliding agent can be applied efficiently at the location where it is desired, as a result of which the applied quantity can be kept limited.

The local application has also as an advantage that the strip may consist of a relatively thick layer of this sliding agent without creating any disadvantage.

More particularly, it is preferred that precisely one strip is applied.

Each respective strip in original, undeformed condition preferably has a maximum width of 4 mm.

The strip does not have to be continuous and may, for example, also consist of a succession of line portions, dots, and so on.

Preferably, the sliding agent is kept away from the upper edge of the floor panel, with the advantage that the sliding agent, when deformed, can not appear at the upper side of the floor covering. In first instance, this is of importance when a strip of some thickness is applied.

Specifically, it is preferred that between the upper edge and the strip of sliding agent that has been applied on a top area which is situated closest to the upper edge when seen along the contour of the surface, a receiving space is provided, as a result of which possible surplus sliding agent which is pressed aside can be taken up, so that the sliding agent cannot move up to the upper side. Such an intermediate receiving space may also be provided in the direction towards the lower edge.

As already becomes clear from the foregoing, preferably a deformable material is applied as a sliding agent.

More particularly, this sliding agent preferably is plastically deformable and, for example, meltable, but sets at room temperature, such that, during the manufacturing of the floor panels, it may be sprayed or be applied by means of a supply nozzle, in liquid form.

Suitable sliding agents are, amongst others, wax, in particular, paraffin.

It is noted that impregnating a tongue-and-groove of floor panels with paraffin is known but that this is performed to render the tongue-and-groove connection more resistive against the penetration of water. Hereby, the paraffin is applied over the entire surface of the tongue-and-groove and this in such a way that the paraffin completely penetrates into the surface. As a result thereof, this paraffin can not remedy the aforementioned problems arising with a tongue-and-groove connection engaged under a certain tension.

According to the invention, the sliding agent, more particularly, the paraffin, is applied in such a manner that a lubricating and/or sliding effect and, even better, a lubricating film is obtained. The necessary quantity of sliding agent depends on the material of the floor panels, the shape of the coupling and, eventually, when there is a tension between the floor parts, the value of this tension. This necessary quantity can be determined by tests.

In the case of a layer "lying on top", the thickness with which the sliding agent is provided, preferably is at least such that, at least with a glossy-looking sliding agent, a glossy surface remains visible after the application. More particularly, it is preferred that the layer of sliding agent in such case has an average thickness in the order of magnitude of 0.05 mm or more, although smaller thicknesses in principle are not excluded.

According to the invention, the tongue and/or groove can also be treated with a surface treatment product for sealing and/or hardening the surface, in which case the sliding agent is applied on top of this product, as a result of which the additional advantage is obtained that the sliding agent will not penetrate into the floor panels until after a certain period of time.

According to a particular embodiment of the invention, the surface of the edge of the floor panel is treated at least partially, but preferably entirely with a liquid mixture of at least one sealing agent and one sliding agent. By means of this treatment method which is performed in the factory, in one treatment a seal against humidity penetration, as well as a lubrication effect is obtained simultaneously. Such mixture has as a result that, after the application thereof on the milled tongue-and-groove profile, the sealing agent is absorbed in the material of the floor panel and fills the pores thereof, whereas the sliding agent remains at the surface. In this case, the sealing agent preferably is made of polyurethane, and the sliding agent of a wax, an oil or an oil-like substance.

The application of the mixture may take place in any manner, for example, by atomization, spraying, application by means of small rollers, etc.

More particularly the above-said sealing agent may be combined with the use of a strip of sliding agent applied on top, whereby then, at the location of this strip, a relatively thick layer of sliding agent is present, whereas a smaller quantity is present on the rest of the surface.

The tongue and the groove of the tongue-and-groove connection preferably have such a form that, in coupled position, they exert a certain tensioning force upon each other, in a preferred form of embodiment a tensioning force by means of which the mutually coupled floor panels are forced towards each other, in which case the strip of sliding agent is at least present on one or more portions of the contact surfaces of the tongue and/or the groove where this tensioning force is exerted or reacted. It is in fact at these portions where the largest friction occurs and the risk is greatest that an undesired noise will be created when the floor covering is stepped on.

According to a particular form of embodiment, the floor covering includes a tongue-and-groove connection comprising one or more portions which bend elastically when being joined together and taken apart, respectively, as certain portions of the coupling parts during joining and taking apart are forced over each other with a certain force. The aforementioned sliding agent at least is provided at the location of one or more of the portions which have to be forced over each other with a certain force. As a result thereof, the sliding agent also forms a lubricating agent, whereby fraying of the HDF or MDF is excluded, even if the floor panels are joined and taken apart repeatedly.

Moreover, in this case the sliding agent facilitates the mutual joining, by turning or clicking in, of the tongue and groove of a tongue-and-groove connection between two adjacent floor panels.

A portion of the floor panels defining the groove may be an elastically bendable lip, and the shape of the tongue and groove may be such that the tongue only fits into the groove by bending this lip and the sliding agent is applied on this lip or on the portion of the tongue opposite thereof.

The locking can be performed by a protrusion on the tongue and a recess in the wall of the groove. The sliding agent then preferably will be applied on this protrusion.

According to a particular embodiment, the risk for creating creaking sounds can also be avoided, or at least minimized, by using an elastic coating instead of a sliding agent. To this aim, an elastic coating is applied at least on one of the floor panels, at least at the location where the floor panels cooperate with each other, which coating, during a mutual shifting between the cooperating portions of the actual floor panels, enables local deformation in the material of the coating, as a result of which the risk of shifting at the contact surface between the coatings themselves, or between the coating and the surface of the other floor panel, is avoided or at least resisted and minimized.

This invention thus relates to a floor panel for a floor covering according to any of the preceding embodiments which is characterized in that it is provided by the factory on at least at one of its edges with a sliding agent or an elastic coating, as described above, as well as in the description below.

DESCRIPTION OF THE DRAWINGS

With the intention of better showing the characteristics of the invention, hereafter, as examples without any limitative character, several preferred forms of embodiment are described, with reference to the accompanying drawings, wherein:

FIG. 1 represents a view in perspective of a floor panel according to the invention;

FIG. 2 represents a cross-section according to line II—II in FIG. 1, drawn at a larger scale;

FIG. 3, at an even larger scale, represents the part which is indicated by F3 in FIG. 2;

DETAILED DESCRIPTION

Figure 4:
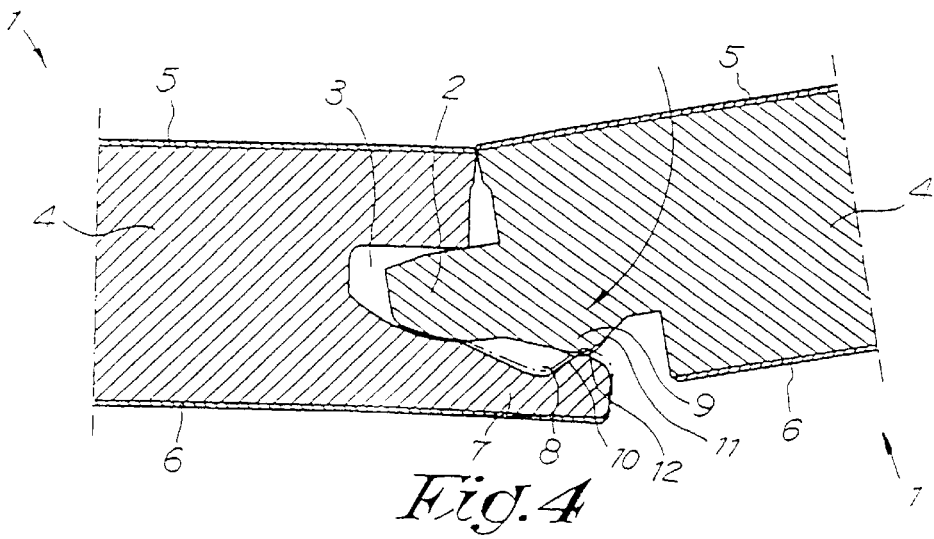
FIGS. 4 and 5 in cross-section represent two floor panels according to the invention, during the mutual coupling and locking in respect to each other.

The floor panel according to the invention comprises a hard floor panel 1, as represented in FIGS. 1 to 3, which are mutually coupled with other ones of the panel in a glueless fashion by means of a tongue-and-groove connection, consisting of a tongue part 2 and a groove part 3 of a desired shape.

The represented floor panel 1 is a laminate panel and comprises a hard core 4 made of MDF sheet, HDF sheet, or similar, a layer 5 at the stepping (upper) side, and a layer 6 at the rear (bottom) side.

The layer 5 may be multi-layered and comprises, for example, a decorative layer with a protective transparent resin layer thereupon. The layer 6 may consist of a paper layer impregnated with resin or such.

This floor panel 1 is rectangular, but may also have other shapes. This floor panel 1 has a tongue part 2 at one longitudinal edge over its entire length, whereas its opposite longitudinal edge has a groove part 3 over its entire length.

In an analogous manner, such tongue part 2 preferably is also present at one perpendicular edge, whereas the opposite perpendicular edge is provided with such a groove part 3.

In cross-section, the tongue 2 and groove 3 have such a form that a tongue 2 of a floor panel 1 can be brought by turning or clicking (snapping) into a groove 3 of a similar second floor panel 1 and that after coupling a locking is obtained, in the direction parallel to the plane of the floor covering, transverse to the tongue-and-groove connection 2–3, as well as in the direction which is perpendicular to this plane and, thus, vertical, whereby the coupling parts of the tongue-and-groove connection 2–3, in otherwords, the tongue 2 and the groove 3 in coupled position, preferably exert a tensioning force upon each other, as a result of which the coupled floor panels 1 are forced towards each other.

In the example represented in FIGS. 1 to 3, this is achieved in that each floor panel 1, at the side of the groove 3, comprises an elastically bendable lip 7 in which a recess 8 is provided over the entire length, and the tongue 2 has at its underside a protrusion 9 over its entire length.

This protrusion 9 is placed at such a location and has such a shape that, when the tongue 2 of a floor panel 1 is provided in a groove 3 of an identical floor panel 1 coupled thereto, the side of the recess 8 in this groove 3 directed to the center of the first floor panel 1 with an inclined surface 10 comes into contact with an inclined contact surface 11 of the side of the protrusion 9 of this tongue 2 directed to the center of the first-mentioned floor panel 1.

The contact surfaces 10 and 11 which are inclined relative to the stepping side and the rear side of the floor panels 1 fit against each other with a certain tensioning force because the elastically bendable lip 7 bordering the last-mentioned groove 3, in coupled position of two floor panels 1, is bent in an extremely small order, for example, over several hundreds to tenths of a millimeter, and therefore provides for a compressing force in the vertical direction.

It is noted that the form of the tongue-and-groove connection 2–3 hereby is such that the tensioning force which forces the floor panels 1 towards each other, substantially exerts a pressure only at two places, namely by means of a line contact at the location of the upper edge where the decorative layer is situated, and, a band-shaped contact, formed at the contact surfaces 10 and 11.

Due to this recess 8 and this protrusion 9 and furthermore the conventional engagement of the tongue 2 in the groove 3, the floor panels 1 are locked in a direction parallel to the aforementioned sides of the floor panels 1 as well as in a direction vertical thereto.

The two lateral edges of the core 4, and, therefore, the tongue 2 as well as the groove 3, preferably are impregnated with a surface treatment product, for example, with polyurethane. This possible impregnation, however, is not shown in FIGS. 2 to 6.

A feature of the invention is that at the edges of the floor panel 1, at the tongue 2 and/or the groove 3, a sliding agent 12 is provided.

According to the embodiment represented in FIGS. 1 to 6, on at least at one of two contact surfaces 10 and 11, in this case, on the contact surface 11 of the tongue 2, a strip of sliding agent 12 is provided.

The strip of sliding agent 11 is kneadable or plastically deformable, and the sliding agent therefore at room temperature is in solid form. It can be meltable such that it may be sprayed after heating and can be sprayed onto the tongue 2 by means of a spray nozzle, as represented in FIG. 2, or by means of a needle-shaped nozzle or in any other manner.

Suitable sliding agents are, as already mentioned, mineral or synthetic wax, such as paraffin. Paraffin is easy to melt (between 55 and 80° C., depending on the composition), but also sets very rapidly at room temperature after spraying. It can be sprayed by means of spraying devices and/or application nozzles available on the market. Moreover, it is an environmentally acceptable product.

In fact, the sliding agent 12 is provided over the tip of the protrusion 9 with a tangible thickness, in such a manner that the strip of sliding agent 12 extends at opposite sides of this tip, as represented clearly in FIGS. 2 and 3. The strip of sliding agent 12 does not only cover the contact surface 11 at one side of the tip, but also a portion of the surface at the other side of the tip.

Figure 5:
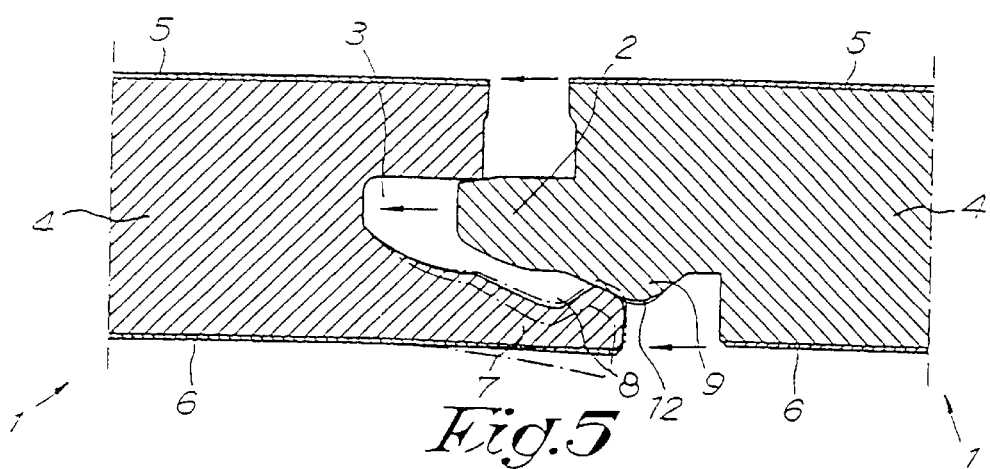

Bringing a tongue 2 into a groove 3 in order to couple two adjacent floor panels 1 to each other and lock them as well in vertical as in horizontal direction may take place by having one floor panel 1 undergo a downward pivoting movement during this mounting, as represented in FIG. 4, or by clicking them into each other by a sidewards shifting movement, as represented in FIG. 5.

After two floor panels 1 have been coupled to each other with their longitudinal edges, the transverse edges of those floor panels 1 can be coupled to the other, for example, by clicking-in.

In both cases, but in the first place in the second case, the lip 7 temporarily is somewhat bent, and the tip of the protrusion 9, which is covered with the strip of sliding agent 12, has to push away a portion of the lip 7 with a certain force.

It is clear that the sliding agent 12 on this tip facilitates this by reducing the friction.

Figure 6:
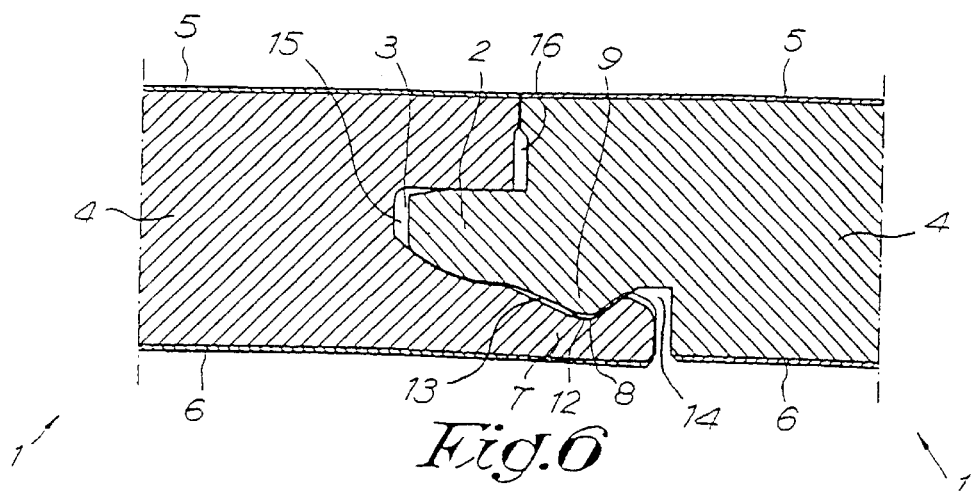
FIG. 6 in cross-section represents the two floor panels after having been coupled to each other.

When the tongue 2 is completely engaged in the groove 3, as represented in FIG. 6, a thin layer of sliding agent 12 will be present between the two contact layers 10 and 11, and a possible surplus of sliding agent 12 will have been pushed away, on one hand, into the small receiving space 13 which remains at the side of the tip situated opposite to the contact surfaces 10 and 11, between the tongue 2 and the lowermost wall of the groove 3, and, on the other hand, into the receiving space 14 between the end of the lip 7 of one floor panel 1 and the portion of the other floor panel 1 situated below the tongue 2.

In an extreme case, when, however, a surplus of sliding agent 12 has been applied, not only the receiving space 13, but also the receiving spaces 15 and 16 will provide for that the surplus sliding agent 12 is to be collected therein, in such a manner that this sliding agent 12 never will appear at the upper side of the floor covering.

When a floor covering consisting of the floor panels 1 described heretofore is stepped on, those floor panels 1, in the first place if they are placed upon a somewhat resilient underlay, may perform a minor hinge-like movement in respect to each other without, however, creating a gap.

As a result of the fact that a sliding agent 12 is present on the aforementioned tip and between the contact surfaces 10 and 12, the aforementioned hinge-like movement will cause a minimum friction between the contact surfaces 10 and 11 such that, even after a long period of time, wear and tear will be very limited and no play will be created between tongue 2 and its groove 3. There will also be no sound or creaking to be heard during this hinge-like movement.

The invention is in no way limited to the form of embodiment described heretofore and represented in the figures, on the contrary may such floor covering and such floor panel be produced in various ways without departure from the scope of the invention.

So, the sliding agent 12 may also be placed in the recess 8 instead of at the tip of the protrusion 9. In this case, too, the last-mentioned advantages are obtained. Sliding agent 12 may also be provided on the aforementioned tip as well as in the aforementioned recess 8.

The tongue 2 and the groove 3 may, of course, have another profile than described heretofore and represented in the figures. The invention will be particularly advantageous in those cases whereby the tongue 2 and the groove 3 allow for a glue-free coupling without play, with a locking in the plane of the floor covering as well as in a direction perpendicular thereto, whereby, thus, portions of the tongue 2 are pressed with a tensioning force against portions of the wall of the groove 3.

It is clear that, by means of an appropriate dosage, the sliding agent may also be applied over a larger portion of the surface.

Of course, the use of the sliding agent 12 does not necessarily have to be combined with the use of a surface treatment product.

Figure 7:
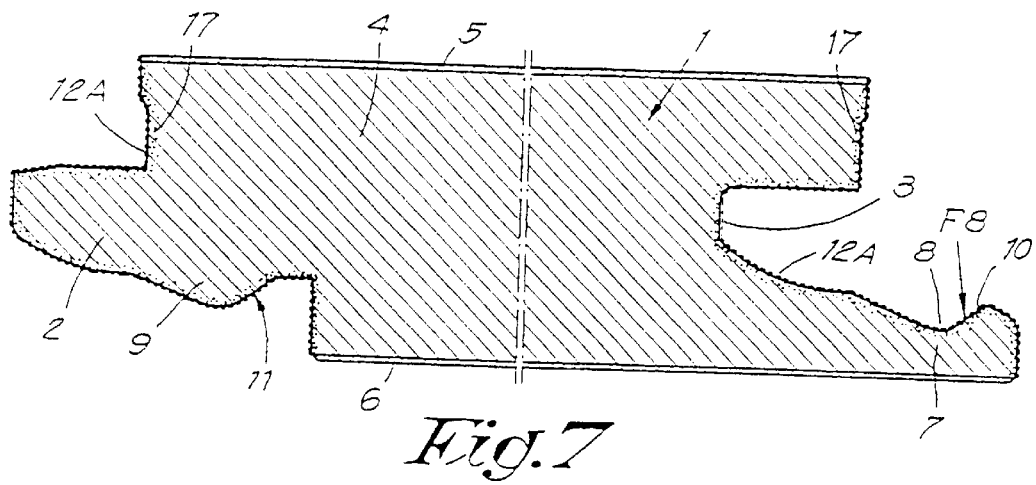
FIG. 7 in cross-section shows another embodiment of the invention.

In FIG. 7, the form of embodiment already mentioned in the introduction is represented schematically, whereby the tongue 2 and the groove 3 are treated by means of a mixture of sealing agent and sliding agent, as a result of which a layer of sealing agent 17 and a layer of sliding agent 12A have been formed, whereby the layer of sealing agent 17, for example, polyurethane, substantially is situated within the material of the floor panel 1, whereas the sliding agent 12A, for example, wax, oil or a paraffin, has remained on the outer surface. The set sealing agent 17 prevents the absorption of the sliding agent 12A, as a result of which this latter remains active. Preferably, the wax consists of a viscous compound based on silicone, more particularly polysiloxane-copolymer. A small quantity of even less than 1% in respect to the entire mixture may already suffice.

Figure 8:
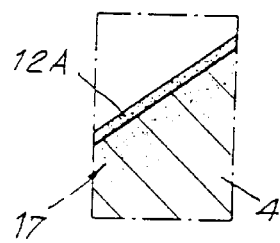
FIG. 8 schematically represents an enlargement of the portion indicated by F8 in FIG. 7.

FIG. 8 shows a schematic enlargement.

Although the use of a mixture offers the advantage that only one treatment is required for the application, it is clear that the invention also relates to embodiments whereby the sealing agent 17 and the sliding agent 12A are applied on the edge successively.

It is also clear that the mixture may also be applied in the shape of a strip.

Figure 9:
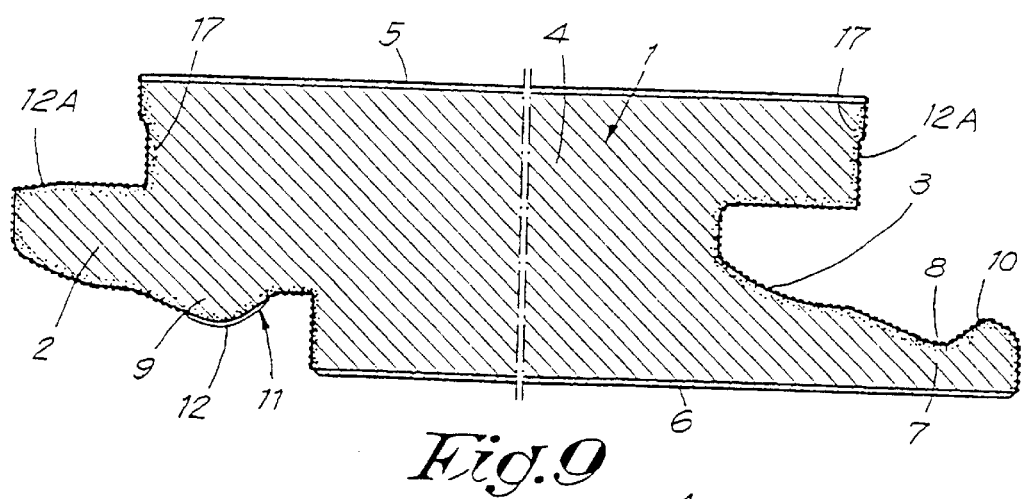
FIG. 9 represents another embodiment of the invention.

FIG. 9 shows a further variant whereby the technique which is applied in FIG. 7 is combined further with a local strip of sliding agent 12.

Figure 10:
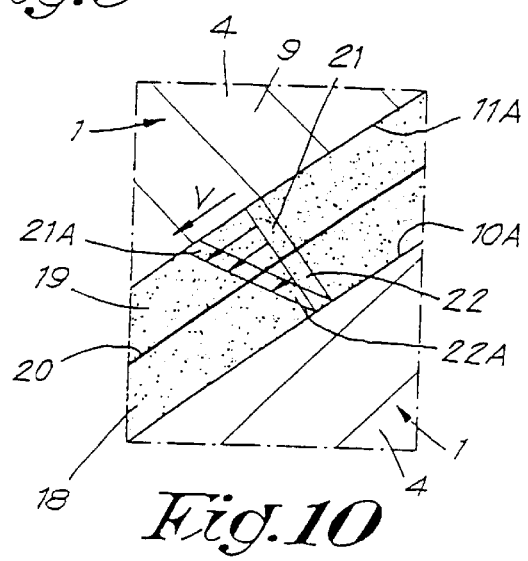
FIG. 10 represents a portion of another embodiment.

FIG. 10 shows an enlargement from a variant whereby at the location where the floor panels 1 cooperate with each other, in this case, on the contact surfaces 10A and 11A, an elastic coating 18, 19 respectively, is provided which allows for a deformation within its thickness when a mutual shifting occurs between the actual floor panels 1, in such a manner that there will be no shifting at the location of the contact surface 20 of the coatings 18 and 19.

In FIG. 10, the aforementioned deformation is represented schematically in respect to the material portions 21 and 22. When, as the floor covering is stepped on, a shifting V of the contact surface 11A in respect to the surface 10A takes place, the material portions 21 and 22 at the contact surface 20, so to speak, adhere to each other and are deformed within the thickness to the indicated material portions 21A and 22A. As a result thereof, there will be no shifting of elastic coating materials over each other, but only a deformation within their thickness, as a result of which creaking sounds are excluded, at least, however, with a minor deformation.

It is clear that the sliding agent 12–12A and/or the coatings 18–19, in the case that the floor panels 1 are provided with coupling parts at four sides, can be applied either exclusively along one or both of the longitudinal edges, or along one or both of the longitudinal edges as well as along one or two of the short edges.

Although the invention proves its usefulness in first instance in such embodiments in which the coupling parts of the tongue-and-groove connection exert a tensioning force upon each other, it is clear that it can also be applied in embodiments in which this tensioning force is not present.

What is claimed is:

1. A flooring panel comprising a laminated panel having an MDF/HDF core material and a decorative top surface layer on a top side of the panel terminating at opposed upper edges; said panel including at least two opposed pairs of side edges; tongue and groove connector parts extending along at least one of said pairs of opposed side edges, said connector parts cooperating with each other to couple two ones of said panels to each other along adjacent side edges by means of said connector parts by a tongue part fitting in a groove part; said connector parts including locking portions cooperating to lock the panels against panel separation in directions parallel with the panel top side and perpendicular to the panel top side and perpendicular to the side edges, upon coupling of connected parts of a pair of panels; said tongue and groove coupling parts made from MDF/HDF core material; and a non-metallic sliding agent layer on the surface of at least a portion of a panel edge including a tongue or groove connector part.

2. The flooring panel as claimed in claim 1, wherein the sliding agent covers the entire side edges of the panel that are provided with said connector parts.

3. The flooring panel as claimed in claim 1, said sliding agent comprising at least one strip extending along a respective connector part.

4. The flooring panel as claimed in claim 3, said at least one strip having an initial uniform maximum width of 4 mm.

5. The flooring panel as claimed in claim 3, wherein said at least one strip is located at a position spaced away from an adjacent upper edge of the floor panel.

6. The flooring panel as claimed in claim 5, including at least one receiving space located between a panel upper edge and the strip of sliding agent.

7. The flooring panel as claimed in claim 1, wherein said sliding agent comprises a layer on a respective connector part, said layer having a minimum undisturbed average thickness of about 0.05 mm.

8. The flooring panel as claimed in claim 1, said sliding agent being plastically deformable.

9. The flooring panel as claimed in claim 1, wherein said sliding agent is a wax.

10. The flooring panel as claimed in claim 9, wherein the sliding agent is paraffin.

11. The flooring panel as claimed in claim 1, including a surface treatment material penetrating at least the portion of the panel edge to which the sliding agent is applied, said sliding agent disposed over a portion at least of said surface treatment material.

12. The flooring panel as claimed in claim 1, including a sealing agent mixed with said sliding agent.

13. The flooring panel as claimed in claim 12, said sealing agent comprising polyurethane.

14. The flooring panel as claimed in claim 12, said sliding agent selected from the group consisting of wax and an oil or oily substance.

15. The flooring panel as claimed in claim 14, wherein the wax comprises a silicone based compound.

16. The flooring panel as claimed in claim 15, wherein the silicone based compound is a polysiloxane copolymer.

17. The flooring panel as claimed in claim 12, said mixture of sealing agent and sliding agent being provided on the entire panel edge provided with a connector part, and including at least one additional strip of sliding agent located on said mixture of sealing agent and sliding agent.

18. The flooring panel as claimed in claim 1, said connector parts and locking portions cooperating when connected such that the coupled connector parts exert a tension force upon each other along tension force reacting portions of the connector parts, said sliding agent being provided on at least a portion of at least one of said tension force reacting portion, said tension force urging the coupled connector parts together.

19. The flooring panel as claimed in claim 18, said tension force acting along a band-shaped contact area; said sliding agent formed as a strip located along said contact area.

20. The flooring panel as claimed in claim 1, wherein the groove part of said connector parts includes a lower side; an elastically bendable lip having an upper side extending from said lower side and away from the groove, said sliding agent located on the upper side of the lip.

21. The flooring panel as claimed in claim 1, said sliding agent located on a lower side of the tongue part of said connector parts.

22. The flooring panel as claimed in claim 21, each tongue part of said connector part having a protrusion and each groove part of said connector part having a recess in a lower wall of the groove part, said sliding agent provided on the protrusion.

23. The flooring panel as claimed in the claim 1, wherein upon coupling the coupling parts and locking portions produce a tensioning force on the coupling parts, and wherein a portion of the panel edge that includes the sliding agent comprises at least one area wherein a tensioning force is exerted.

24. The flooring panel as claimed in claim 23, wherein said at least one area includes a portion of said tongue and groove coupling parts.

25. The flooring panel as claimed in claim 23, wherein said one area is band-shaped and is located below said upper edges and on at least one of said coupling parts.

26. The flooring panel as claimed in claim 1, wherein coupling of the coupling parts requires forcing one coupling part over another coupling part, and wherein a portion of the panel edge associated with the coupling parts is elastically bent upon coupling of the coupling parts as a result of said forcing of one coupling part over another coupling part, and said portion of panel edge on which a sliding agent is located comprises at least one area over which one coupling part is forced relative to another coupling part.

27. The flooring panel as claimed in claim 26, including a groove of one connector part comprising a lower lip defining a lower wall of the groove; said tongue of said coupling parts causing bending of said lip upon coupling of the coupling parts, said portion of said panel edge on which said sliding agent is located comprising at least a portion of one of said tongue and groove.

28. The flooring panel as claimed in claim 1, wherein said locking portions include a protrusion on a lower surface of a tongue coupling part that cooperates with a recess in a lower lip defining a lower wall of a groove of said coupling parts, said portion of panel edge on which said sliding agent is located including at least a portion of said protrusion.

29. A flooring panel comprising a laminated panel having an MDF/HDF core material and a decorative top surface layer on a top side of the panel terminating at opposed upper edges; said panel including at least two opposed pairs of side edges; tongue and groove connector parts extending along at least one of said pairs of opposed side edges, said connector parts cooperatirig with each other to couple two ones of said panels to each other along adjacent side edges by means of said connector parts by a tongue part fitting in a groove part; said connector parts including locking portions cooperating upon coupling parts being coupled to lock the panels against panel separation in directions parallel with the panel top side and perpendicular to the panel top side and perpendicular to the side edges, upon coupling of said connector parts of a pair of panels; said tongue and groove connector parts made from MDF/HDF core material; and an elastic coating provided on at least a portion of one of said opposed side edges including one of said tongue and groove connector parts, said elastic coating having elastic properties enabling the elastic coating to accommodate, within its thickness, slight movement between surfaces of pairs of coupled panels connected together at respective connector parts on which said elastic coating is provided without relative surface to surface motion between the surfaces and the adjacent elastic coating.

30. A method for making a floor covering panel comprising the steps:

forming a flooring panel having opposed side edges;

milling a tongue profile and a groove profile at two or more of said edges;

applying a liquid mixture of sealing agent and sliding agent on said edges, including permitting at least part of the sealing agent to be absorbed in the material of the floor panel and with at least part of the sliding agent remaining on the surface of the edges as a solid layer.

31. The method according to claim 30, including selecting as the panel material a material selected from the group consisting of MDF and HDF.

\* \* \* \* \*